United States Patent
Paul et al.

(10) Patent No.: US 6,894,101 B2
(45) Date of Patent: May 17, 2005

(54) CROSS-LINKABLE, HALOGEN-FREE FLAME-RESISTANT PLASTIC MIXTURE, ESPECIALLY FOR CABLES

(75) Inventors: Heinz Paul, Dinslaken (DE); René Herbiet, Eupen (BE); Hans Jürgen Eichler, Elsdorf-Oberembt (DE); Guido Jodocy, Amel (BE); Winifried Toedt, Köln (DE)

(73) Assignee: Martinswerk GmbH, Bergheim (DE)

( * ) Notice: Subject to any disclaimer, the term of this patent is extended or adjusted under 35 U.S.C. 154(b) by 0 days.

(21) Appl. No.: 10/333,673

(22) PCT Filed: Jul. 18, 2001

(86) PCT No.: PCT/EP01/08266
§ 371 (c)(1),
(2), (4) Date: May 16, 2003

(87) PCT Pub. No.: WO02/08331
PCT Pub. Date: Jan. 31, 2002

(65) Prior Publication Data
US 2003/0181563 A1 Sep. 25, 2003

(51) Int. Cl.⁷ ................................................. C08K 3/22
(52) U.S. Cl. ..................... 524/436; 524/99; 524/100; 524/349; 524/350; 524/351; 524/400; 524/437
(58) Field of Search ................... 524/99–100, 349–351, 524/400, 436–437, 394

(56) References Cited

FOREIGN PATENT DOCUMENTS

EP 0546841 6/1993

OTHER PUBLICATIONS

Low–Smoke Self–Extinguishing Electrical Cable and Flame–Retardant . . . Therein Research Disclosure, No. 407, Mar. 1, 1998, pp. 245–262.

*Primary Examiner*—Peter Szekely
(74) *Attorney, Agent, or Firm*—Marcy M. Hoefling

(57) ABSTRACT

The invention relates to a cross-linkable, halogen-free, flame-resistant plastic mixture which can especially be used, in a cross-linkable state, for coating cables. The inventive plastic mixture comprises the following plastic components: (a) 3 to 50 weight parts (phr) of at least one ethylene copolymer from the group comprising ethylene vinyl acetates, ethylene ethyl acrylates, ethylene methyl acrylates or ethylene butyl acrylates, (b) 30 to 96 weight parts (phr) of a high-density polyolefin, especially a HDPE (High Density Polyethylene) having a density of >0.94 g/cm³, and (c) 1 to 20 weight parts (phr) of a polyolefin which has been grafted with a derivative of an unsaturated carboxylic acid, especially HDPE-g carboxylic acid derivatives. Components (a) to (c) together produce a total of 100 weight parts (phr) of plastic. The mixture also comprises the following components: (d) 40 to 250 weight parts (phr) of a filling material, and (e) 0.1 to 15 weight parts (phr) of a stabilizer system.

14 Claims, No Drawings

CROSS-LINKABLE, HALOGEN-FREE FLAME-RESISTANT PLASTIC MIXTURE, ESPECIALLY FOR CABLES

This application is the national phase of PCT/EP01/08266 and claims priority of German application 100 35 647.8, filed Jul. 20, 2000.

The invention concerns a crosslinkable, halogen-free, flame-retardant plastic mixture, especially for use in automobile cables.

Mainly PVC cable insulation or halogenated polyolefin compounds that are rendered flame-retardant, usually with organic bromine compounds, have been used in the past in automobile cables. In the environmental debate relating to both PVC and halogenated flame retardants, these types of insulation materials are coming under increasing pressure. For example, the EU guideline on scrap vehicles provides that, starting on Jan. 1, 2006, 80% of a scrap vehicle must be recycled. Therefore, in regard to automobile cable, it is advantageous, e.g., in the case of thermal utilization, for the cable insulation not to contain any toxic and/or corrosive components, such as halogen compounds.

Another disadvantage of PVC insulation is that increasingly compact engine-compartment construction is leading to greater and greater demands on heat stability. For example, an operating temperature class of 125° C. or even 150° C. is now being demanded, which cannot be realized with PVC sheaths. Crosslinked PE compounds are now being used at temperatures up to 125° C. Of course, these compounds have the disadvantage that they contain halogenated, usually brominated, compounds in order to meet the flame-retardant specifications of the automobile manufacturers. To be sure, halogen-free solutions to this problem are already available. For example, U.S. Pat. No. 5,561,185 describes a flame-retardant plastic mixture that contains 20–60 wt. % of a polypropylene, 1–20 wt. % of a polyethylene modified by an unsaturated carboxylic acid or by derivatives of an unsaturated carboxylic acid, 25–65 wt. % of a metal hydrate, and an ethylene copolymer component.

These types of plastic mixtures are already well known. For example, EP 0 871 181 A1 describes a plastic mixture that consists of 5–85 wt. % (all percentages based on the plastic component) ethylene with a copolymer, in which the fraction of copolymer is 10–30 wt. %, 5–85 wt. % LLDPE, 5–85 wt. % of a polyolefin from the group HDPE or PP, and 5–85 wt. % of an unsaturated carboxylic acid or of an olefin modified by a derivative of an unsaturated carboxylic acid. The sum of the fractions of the specified mixture should be 100 wt. %. The mixture described in this document should also contain 40–150 wt. % of a metal hydroxide as filler.

In addition, BP 0 546 841 A1 describes an abrasion-resistant plastic mixture, which, based on 100 parts by weight of the polymer component, contains 50–90 wt. % of a polyolefinic resin, especially a high-density polyethylene (HDPE), and 10–50 wt. % of a polyethylenic resin, especially an ethylene-vinyl ester copolymer. To improve the flame-retardant properties of the mixture without the use of halogenated compounds, 30–200 parts by weight of an inorganic flame retardant are added, especially a modified form of red phosphorus. In addition, agents may be added to prevent external defects of the product without adversely affecting the physical properties of the composition. Cited examples of such agents include antioxidants, although nothing is said about their stabilizer effect.

The research disclosure "Low-smoke self-extinguishing electrical cable and flame-retardant composition used therein", Kenneth Mason Publications, Hampshire, GB, No. 407, March 1, 1998, pages 245–262, XP 000773863; ISSN: 0374-4353, describes a flame-retardant, halogen-free plastic mixture for cables, which consists, for example, of 60–70% of an ethylene or ethylene-vinyl acetate copolymer and contains 10–20% of a polyolefin and 20% of a low-density polyethylene. To improve the mechanical properties and flame resistance, the differences between natural magnesium hydroxide and synthetic magnesium hydroxide are investigated. Antioxidants are used in these plastic mixtures in the amount of 0.6 wt. % per 100 parts by weight of the plastic mixture. This low porportion by weight of the antioxidant component is unchanged in all of the examples that are given. The effect of this component is not explored.

The previously known halogen-free plastic mixtures for cables have so far achieved only very low abrasion resistance values in the finished compounded state, which do not meet the specifications especially of internal standards of various well-known car manufacturers. Moreover, the problem of inadequate fire resistance of these plastic mixtures persists.

Therefore, the goal of the invention is to make available a plastic mixture that is suitable for the manufacture of electrical and/or optical cables and lines and that has abrasion resistance and fire resistance values that meet the desired specifications.

In accordance with the invention, this goal is achieved by the crosslinkable, halogen-free, flame-retardant plastic mixture specified in Claim 1, which is suitable for the manufacture of electrical and/or optical cables and lines and comprises the following components:

(a) 3–50 parts by weight (phr) of one or more ethylene copolymers from the group comprising ethylene-vinyl acetates, ethylene-ethyl acrylates, ethylene-methyl acrylates, or ethylene-butyl acrylates, (b) 30–96 parts by weight (phr) of a high-density polyolefin, especially an HDPE (high-density polyethylene) with a density >0.94 g/cm$^3$, (c) 1–20 parts by weight (phr) of a polyolefin grafted with a derivative of an unsaturated carboxylic acid, especially HDPE-g-carboxylic acid derivative, (d) 40–250 parts by weight (phr) of a filler, (e) 0.1–15 parts by weight (phr) of a stabilizer system.

The ethylene copolymer preferably has a comonomer content of 8–30% and contains one or more oxygen atoms.

Preferred ethylene copolymers are:

EVA (ethylene-vinyl acetate), EEA (ethylene-ethyl acrylate), EMA (ethylene-methyl acrylate), EBA (ethylene-butyl acrylate), or mixtures thereof.

The high-density polyolefin is an HDPE with a density >0.945 and especially ≧0.945 g/cm$^3$. Good results were obtained, for example, with an HDPE with a density of 0.958 g/cm$^3$. An HDPE of this type is characterized by its special polymer structure (crystallinity, etc.).

The use of an LLDPE as a substitute for the HDPE component is out of the question, even if the density of an LLDPE approaches the density of an HDPE. This non-interchangeability is due to the special polymer structure referred to above.

The polyolefin grafted with a derivative of an unsaturated carboxylic acid serves to improve the polymer compatibility or the polymer-filler compatibility. The derivative of the unsaturated carboxylic acid is preferably a maleic anhydride.

The crosslinkable, halogen-free, flame-retardant plastic mixture is mixed in such proportions that components (a) to (c) together add up to 100 parts by weight. 40–250 parts by weight of the filler, which is a metal hydroxide or a mixture of metal hydroxides with $CaCO_3$, and a balanced stabilizer system are added to these mixtures of plastics standardized to 100 parts by weight. In regard to the stabilizer system, it should be noted that amounts greater or less than the specified values of 0.1–15 parts by weight may be used in the future as a result of further development and variations of the substances that are available. For example, stabilizer systems with a weight fraction of up to 20 phr were used in more recently developed mixtures.

The term "halogen-free" as used in connection with the present invention means that the plastic mixture contains no halogens beyond any impurities that may be present.

In accordance with Claim 2, the plastic mixture of the invention may contain 10–40 parts by weight of the ethylene copolymer, 87 to 50 parts by weight of a high-density polyolefin, especially an HDPE, 3–10 parts by weight of a polyolefin grafted with a derivative of an unsaturated carboxylic acid, 60–150 parts by weight of a filler, and 0.3–15 (20) parts by weight of a stabilizer system.

The carboxylic acid derivative is preferably maleic anhydride, which ensures intense bonding between the matrix and filler, on the one hand, and among the various polymers, on the other hand.

The filler used as component (d) is preferably selected from the group comprising magnesium hydroxides and/or aluminum hydroxides, especially MDH and/or ATH. In addition to the specified metal hydroxides, the filler may contain calcium carbonate ($CaCO_3$).

The specified metal hydroxides may also be coated, e.g., with silanes, zirconates, titanates, or special coatings of the types described in PCT/EP99/06,809, PCT/EP96/00,743 or EP0426196B1.

If a magnesium hydroxide is used, it is preferably a synthetic magnesium hydroxide. Naturally, this does not exclude the possibility of using natural magnesium hydroxide and/or synthetic aluminum hydroxide.

Good results with respect to fire resistance and abrasion resistance were obtained with metal hydroxides, e.g., magnesium hydroxides and/or aluminum hydroxides, with amean particle diameter ($d_{50}$ value) of 0.1–5 $\mu$m. The magnesium hydroxides and/or aluminum hydroxides that are used preferably have a BET specific surface of <30 $m^2/g$, and especially <15 $m^2/g$.

The stabilizer system (e) that is used preferably comprises one or more of the following additives: primary antioxidants, secondary antioxidants, metal deactivators, aminic light stabilizers, hydrolysis stabilizers, UV absorbers, and calcium or zinc stearate. These stabilizer components are needed especially for thermal stabilization during the compounding step, during extrusion, and during irradiation crosslinking, and for the aging in air and resistance to chemical media of the crosslinked cable insulation. Resistance to chemical media means the mechanical stability of a cable sample after storage in various fuels, oils, acids, alkalies, and, in general, the types of liquids typically used in automobiles. In addition it was found that the stabilizer system also has an effect on cable abrasion properties. In addition to the stabilizer system described above, a crosslinking agent, e.g., triallyl cyanurate, may be added to the plastic mixture. The crosslinking agent acts as an activator for the crosslinking process, which occurs either by means of high-energy radiation or by means of additional peroxide crosslinking agents, e.g., dicumyl peroxide.

The plastic mixture may also contain a synergistically acting additive that contains especially a silicon and/or boron compound. This additive is intended to have a synergistic effect especially on the flame-retardant filler. The plastic mixture may also contain agents that enhance its workability (especially extrudability), e.g., a fatty acid or polyethylene wax. In one formulation of the plastic mixture, the stabilizer system contains a primary phenolic antioxidant, a secondary antioxidant with a phosphorus or sulfur compound, a metal deactivator, a hindered aminic light stabilizer (HALS), and calcium stearate.

The proportions of these components in the stabilizer system are as follows:

phenolic primary antioxidant 0.1–6.0 parts by weight, and especially 0.3–3.0 parts by weight, secondary antioxidant 0–12.0 parts by weight, and especially 0.3–6 parts by weight, metal deactivator 0.1–6.0 parts by weight, and especially 0.6–3.0 parts by weight, aminic light stabilizer 0.1–3.0 parts by weight and especially 0.6–1.5 parts by weight, calcium stearate 0–3.0 parts by weight, and especially 0.1–0.5 parts by weight, and aromatic polycarbodiimide 0–6.0 parts by weight, and especially 2–4 parts by weight.

In this connection, it should be noted that suitable selection of the aminic light stabilizer may make it possible to eliminate the primary antioxidant wholly or partially from the stabilizer system. In this case, a higher proportion of the aminic light stabilizer would possibly be used.

The addition of a component (f), which consists of an ethylene-octene copolymer or an ethylene-hexene copolymer or an ethylene-butene copolymer, in proportions of 1–20 phr, and especially 3–12 phr, results in increased flexibility of the cable extruded from the compound.

The plastic mixtures of the invention can be produced by mixing the individual components by methods that are already well known. The plastic mixture is preferably produced by mixing the components in a Buss Ko-kneader, a twin-screw kneader, or an internal mixer. After the plastic mixture has been produced, a granulated material is removed from the kneaders, which is used to produce the electrical and/or optical cables and lines that are to be manufactured from the plastic mixture in accordance with the invention. This is accomplished by extrusion methods, in which the optically or electrically active metal or glass-fiber core of a cable is directly covered with a cable sheath made of the plastic mixture of the invention.

Cables and lines that are covered with the crosslinked plastic mixture of the invention as sheathing material are highly flame-retardant and have excellent abrasion resistance, even with extremely small cable diameters and insulation thicknesses.

In addition to their good abrasion properties and fire resistance, the crosslinked plastic mixtures of the invention have very good mechanical properties, as we were able to determine by the cold coiling test and the test for percent elongation at break.

The invention is illustrated by the following examples.

EXAMPLE 1

A plastic mixture was produced from 30 parts by weight EVA (with 12 wt. % VA), 65 parts by weight HDPE (density 0.945), 5 parts by weight HDPE-g-MAH (HDPE grafted with maleic anhydride), 100 parts by weight MDH (a coated MDH produced by the company Alusuisse Martinswerk GmbH), 0.3 part by weight of a metal deactivator, 0.15 part by weight of a phenolic primary antioxidant, 0.15 part by weight of a secondary antioxidant, and 2.0 parts by weight of a crosslinking activator. The plastic components are first premixed by standard methods with the stabilizer system and the crosslinking activator, and the finished mixture, together with 50% of the filler, is then fed into a Buss Ko-kneader through the first feed worm by means of two gravimetric metering batchers. The second portion of filler (50% of 100 parts by weight) was added through the second feed worm with another metering batcher, and pellets were produced in the usual way by discharge through a discharge extruder with front granulation. The dried pellets were used to extrude a cable with a total diameter of 1.2 mm, which contained a copper conductor with a cross-sectional area of 0.35 mm². The cable produced in this way was then crosslinked by high-energy radiation and subjected to the following tests:

1. Abrasion Test

This test was performed with an apparatus in which a piece of cable about 140 mm long can be clamped by means of suitable mounting devices in such a way that about 70 mm of the middle region of the piece of cable rests flat on a support. In this region, a metal needle (material as specified in ISO 8458-2) with a diameter of 0.45 mm is set vertically on the piece of cable. A force of 7±0.05 N is applied to the needle, which is then drawn along the cable specimen by means of a guide device. The travel of the needle is 20 mm. The frequency of this needle movement is 55±5 cycles per min. One complete back-and-forth movement of the needle along the piece of cable constitutes one cycle. The test is automatically terminated when the needle makes contact with the conductor inside the piece of cable. The measurement is carried out four times at room temperature, and the mean value is given as the result.

2. Fire Resistance Test

In this test, a piece of cable with insulation at least 600 mm long was fastened to a mounting device at an angle of 45°. A gas-operated Bunsen burner with an inside diameter of 9 mm was adjusted in such a way that the total length of the flame was 100 mm, and the blue flame cone inside the flame was 50 mm long. The Bunsen burner is brought up to the cable specimen from below in such a way that it forms an angle of 90° with the cable, and in such a way that the tip of the blue flame cone touches the cable. The point of contact of the flame with the cable is 500 mm from the upper end of the insulation. The cable is exposed to the flame for 5 s, and at most until the conductor becomes visible.

3. Cold Coiling Test

The test was conducted using the standard test with which the expert is familiar, i.e., the test specified in DIN 72551, Part 5.3.6.3, at −40° C.

4. Test of Percent Elongation at Break

The test was carried out on specimens taken from the cable insulation with the standard test with which the expert is familiar, i.e., the test specified in DIN-VDE 0472, Part 602.

The test results are compiled in Table 1.

TABLE 1

| Abrasion Target: >200 cycles | Fire Resistance, s Target: <30 s | Cold Coiling Test: at −40° C. | Elongation at Break, % |
|---|---|---|---|
| 336 | 13 | passed | 165 |

EXAMPLE 2

A plastic mixture was produced from 30 parts by weight EVA (with 12 wt. % VA), 65 parts by weight HDPE, 5 parts by weight HDPE-g-MAH, 100 parts by weight MDH (a coated MDH produced by the company Alusuisse Martinswerk GmbH), 0.5 part by weight of a phenolic primary antioxidant, 0.6 part by weight of an aminic light stabilizer, 0.6 part by weight of a metal deactivator, 0.2 part by weight calcium stearate, and 2.0 parts by weight of a crosslinking activator. The plastic mixture was processed into pellets by the method described in Example 1. The pellets were used to produce a cable, which was then crosslinked by high-energy radiation. The cable was 1.2 mm in diameter and had a copper conductor core with a cross-sectional area of 0.35 mm². The cable was subjected to the tests described above. The test results are compiled in Table 2.

TABLE 2

| Abrasion Target: >200 cycles | Fire Resistance, s Target: <30 s | Cold Coiling Test: at −40° C. | Elongation at Break, % |
|---|---|---|---|
| 717 | 14 | passed | 130 |

As the examples show, the cables produced with the plastic mixture of the invention have abrasion values that far exceed the stipulated minimum number of cycles of 200. Moreover, the fire resistance values are well below the stipulated minimum requirement of 30 s. The mechanical properties of the plastic mixture compounded in accordance with the invention are also very good.

A comparison of Example 1 with Example 2 clearly shows the effect of a balanced stabilizer system in accordance with Claim 11 on abrasion resistance, which increased from 336 cycles in Example 1 to 717 cycles in Example 2.

What is claimed is:

1. Cross-linkable, halogen-free, flame-retardant plastic mixture, especially for cables, comprising the plastic components (a) 3–50 phr of at least one ethylene copolymer from the group comprising ethylene-vinyl acetates, ethylene-ethyl acrylates, ethylene-methyl acrylates, or ethylene-butyl acrylates, (b) 30–96 phr of a high-density polyolefin, and (c) 1–20 phr of an HDPE grafted with a maleic anhydride, such that components (a) to (c) together add up to 100 phr of plastic, further comprising the additional components (d) 40–250 phr of a filler, and (e) a stabilizer system, the components of which are present in the following proportions:

the phenolic primary antioxidant: 0.1–6.0 phr, the secondary antioxidant: 0–12.0 phr, the metal deactivator: 0.1–6.0 phr, the aminic light stabilizer: 0.1–3 phr, the calcium stearate: 0–3 phr, the aromatic polycarbodiimide: 0–6.0 phr.

2. Cross-linkable, halogen-free, flame-retardant plastic mixture in accordance with claim 1, characterized by the fact that the mixture contains the following proportions of components (a), (b), (c), (d) and (e):

(a) 10–40 phr, (b) 87–50 phr, (c) 3–10 phr, (d) 60–150 phr, and (e) 2–15 phr.

3. Cross-linkable, halogen-free, flame-retardant plastic mixture in accordance with claim 1, wherein component (d) is a filler selected from the group consisting of magnesium-hydroxides and aluminum hydroxides.

4. Cross-linkable, halogen-free, flame-retardant plastic mixture in accordance with claim 1, wherein component (d) comprises coated magnesium hydroxides or coated aluminum hydroxides, or coated magnesium hydroxides and coated aluminum hydroxides.

5. Cross-linkable, halogen-free, flame-retardant plastic mixture in accordance with claim 3, wherein the magnesium hydroxide is synthetic [MDH] magnesium dihydroxide.

6. Cross-linkable, halogen-free, flame-retardant plastic mixture in accordance with claim 3, wherein the magnesium hydroxides and/or the aluminum hydroxides have a mean particle diameter ($d_{50}$ value) of 0.1–5 $\mu$m.

7. Cross-linkable, halogen-free, flame-retardant plastic mixture in accordance with claim 3, wherein the magnesium hydroxides and/or the aluminum hydroxides have a BET specific surface of <30 $m^2$/g.

8. Cross-linkable, halogen-free, flame-retardant plastic mixture in accordance with claim 1, wherein components of the stabilizer system (e) are present in the following proportions:

the phenolic primary antioxidant: 0.1–3.0 phr,
the secondary antioxidant: 0–3.0 phr,
the metal deactivator: 0.1–3.0 phr,
the aminic light stabilizer: 0.1–3.0 phr,
the calcium stearate: 0–3 phr.

9. Cross-linkable, halogen-free, flame-retardant plastic mixture in accordance with claim 1, wherein the mixture contains an additional component (f) in proportions of 1–20 phr, such that component (f) consists of an ethylene-octene copolymer or an ethylene-hexene copolymer or an ethylene-butene copolymer.

10. The cross-linkable, halogen-free, flame-retardant plastic mixture according to claim 1, wherein the components of the stabilizer system are present in the following proportions:

the phenolic primary antioxidant: 0.3–3 phr,
the secondary antioxidant: 0.3–6 phr,
the metal deactivator: 0.6–3.0 phr,
the aminic light stabilizer: 0.6–1.5 phr,
the calcium stearate: 0.1–0.5 phr,
the aromatic polycarbodiimide: 2–4 phr.

11. The cross-linkable, halogen-free, flame-retardant plastic mixture in accordance with claim 3, wherein component (d) is a filler selected from the group consisting of magnesium dihydroxide and aluminum trihydroxide.

12. The cross-linkable, halogen-free, flame-retardant plastic mixture in accordance with claim 8, wherein the components of the stabilizer system (e) are present in the following proportions:

the phenolic primary antioxidant: 0.3–1.5 phr,
the secondary antioxidant: 0.3–1.5 phr,
the metal deactivator: 0.3–1.5 phr,
the aminic light stabilizer: 0.6–1.5 phr,
the calcium stearate: 0.1–0.5 phr.

13. The cross-linkable, halogen-free, flame-retardant plastic mixture in accordance with claim 9, wherein the mixture contains the additional component (f) in proportions of 3–12 phr.

14. Cross-linkable, halogen-free, flame-retardant plastic mixture in accordance with claim 3, wherein the magnesium hydroxides and/or the aluminum hydroxides have a BET specific surface of <15 $m^2$/g.

* * * * *